(12) United States Patent
Beatenbough et al.

(10) Patent No.: US 12,529,469 B2
(45) Date of Patent: *Jan. 20, 2026

(54) CEILING LIGHT LED RETROFIT KIT

(71) Applicant: Power Concepts, LLC, Anderson, SC (US)

(72) Inventors: Bryan Beatenbough, Anderson, SC (US); Ryan Haley, Hartwell, GA (US)

(73) Assignee: Power Concepts, LLC, Anderson, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/629,651

(22) Filed: Apr. 8, 2024

(65) Prior Publication Data
US 2024/0255125 A1 Aug. 1, 2024

Related U.S. Application Data

(63) Continuation of application No. 18/130,531, filed on Apr. 4, 2023, now Pat. No. 11,953,183, which is a
(Continued)

(51) Int. Cl.
*F21V 21/03* (2006.01)
*F21K 9/27* (2016.01)
(Continued)

(52) U.S. Cl.
CPC ............... *F21V 21/03* (2013.01); *F21K 9/27* (2016.08); *F21K 9/272* (2016.08); *F21S 8/04* (2013.01);
(Continued)

(58) Field of Classification Search
CPC .......... F21K 9/272; F21K 9/275; F21K 9/278; F21K 9/27; F21V 21/02; F21V 21/025; F21V 21/03; F21Y 2115/10; F21S 8/04
See application file for complete search history.

(56) References Cited

U.S. PATENT DOCUMENTS 2,981,829 A 4/1961 Rosenblatt et al.
3,673,402 A 6/1972 Weiss
(Continued)

FOREIGN PATENT DOCUMENTS

| CA | 2816449 A1 | 8/2014 |
| CN | 110636663 A | 12/2019 |
| KR | 102070096 B1 | 1/2020 |

OTHER PUBLICATIONS

ILP Low Profile Webinar Slides, "Low Profile Channel LED Fixture or Retrofit" (ILP Retrofit Video Screenshots).
(Continued)

*Primary Examiner* — Robert J May
(74) *Attorney, Agent, or Firm* — Nelson Mullins Riley & Scarborough LLP

(57) ABSTRACT

A combination for illuminating the interior of a building comprises a fixture and a retrofit kit. The fixture has a base attached to a building ceiling, the fixture having a first tombstone, and a second tombstone. The first and second tombstones are configured to receive between them a fluorescent light tube. The retrofit kit is connected to the base. The retrofit kit includes a light panel, the light panel having a first side facing the fixture and an opposite second side. The light panel resides between the first tombstone and the second tombstone, and the fixture resides above the light panel. The combination is devoid of a fluorescent light tube. The base and the light panel define between them a raceway. A light emitting diode is disposed on the second side of the light panel.

15 Claims, 8 Drawing Sheets

Related U.S. Application Data continuation of application No. 17/023,506, filed on Sep. 17, 2020, now Pat. No. 11,649,952, which is a continuation of application No. 16/546,729, filed on Aug. 21, 2019, now Pat. No. 10,837,628, which is a continuation of application No. 15/441,447, filed on Feb. 24, 2017, now Pat. No. 10,429,041.

(60) Provisional application No. 62/299,295, filed on Feb. 24, 2016.

(51) Int. Cl.
  *F21K 9/272* (2016.01)
  *F21S 8/04* (2006.01)
  *F21V 15/015* (2006.01)
  *F21Y 115/10* (2016.01)

(52) U.S. Cl.
  CPC ......... *F21V 15/015* (2013.01); *F21Y 2115/10* (2016.08)

(56) References Cited

U.S. PATENT DOCUMENTS

| | | | |
|---|---|---|---|
| 6,739,734 | B1 | 5/2004 | Hulgan |
| 6,969,179 | B2 | 11/2005 | Sloan et al. |
| 7,038,399 | B2 | 5/2006 | Lys et al. |
| 7,114,830 | B2 | 10/2006 | Robertson et al. |
| 7,296,911 | B2 | 11/2007 | Plunk et al. |
| 7,311,423 | B2 | 12/2007 | Frecska et al. |
| 7,344,279 | B2 | 3/2008 | Mueller et al. |
| 7,351,075 | B1 | 4/2008 | Patterson et al. |
| 7,438,441 | B2 | 10/2008 | Sun et al. |
| 7,476,004 | B2 | 1/2009 | Chan |
| 7,507,001 | B2 | 3/2009 | Kit |
| 7,614,195 | B2 | 11/2009 | Platt et al. |
| 7,661,229 | B2 | 2/2010 | Frecska et al. |
| 7,679,222 | B2 | 3/2010 | Patterson et al. |
| 7,762,821 | B2 | 7/2010 | Patterson et al. |
| 7,936,129 | B2 | 5/2011 | GWisdalla et al. |
| 7,997,910 | B2 | 8/2011 | Myers et al. |
| 8,062,042 | B2 | 11/2011 | Patterson et al. |
| 8,272,763 | B1 | 9/2012 | Chinnam et al. |
| 8,584,412 | B2 | 11/2013 | Frecska et al. |
| 8,696,154 | B2 | 4/2014 | Hutchens |
| 8,727,566 | B1* | 5/2014 | Szeto ............ F21S 8/026 362/249.02 |
| 8,740,636 | B2 | 6/2014 | Myers et al. |
| 8,789,966 | B2 | 7/2014 | McCanless et al. |
| 8,881,481 | B2 | 11/2014 | Myers et al. |
| 8,896,208 | B2 | 11/2014 | Shew |
| 9,163,794 | B2 | 10/2015 | Simon et al. |
| 9,182,107 | B2 | 11/2015 | Ekey et al. |
| 9,243,757 | B2 | 1/2016 | Barnetson et al. |
| 9,243,759 | B2 | 1/2016 | Lin et al. |
| 9,255,667 | B2 | 2/2016 | Zhang et al. |
| 9,307,598 | B2 | 4/2016 | Maa et al. |
| 9,380,654 | B2 | 6/2016 | Dankovits et al. |
| 9,469,988 | B2 | 10/2016 | Myers et al. |
| 9,660,401 | B2 | 5/2017 | Myers et al. |
| 9,726,331 | B1 | 8/2017 | May |
| 9,845,596 | B2 | 12/2017 | Frantz et al. |
| 9,951,916 | B2 | 4/2018 | Oleske et al. |
| 10,253,962 | B2 | 4/2019 | Xiao et al. |
| 10,288,240 | B2 | 5/2019 | Szeto et al. |
| 10,408,394 | B2 | 9/2019 | Bugenske et al. |
| 10,429,041 | B2 | 10/2019 | Beatenbough et al. |
| 10,837,628 | B2 | 11/2020 | Beatenbough et al. |
| 2006/0221606 | A1 | 10/2006 | Dowling |
| 2007/0165399 | A1 | 7/2007 | Yaphe et al. |
| 2008/0266849 | A1 | 10/2008 | Nielson et al. |
| 2010/0289428 | A1 | 11/2010 | Frazier et al. |
| 2010/0315001 | A1 | 12/2010 | Domagala et al. |
| 2012/0113628 | A1 | 5/2012 | BurroW et al. |
| 2014/0168961 | A1 | 6/2014 | Dubord |
| 2014/0177209 | A1 | 6/2014 | Carney et al. |
| 2014/0268748 | A1 | 9/2014 | Lay et al. |
| 2015/0003070 | A1 | 1/2015 | Medendorp, Jr. et al. |
| 2015/0345751 | A1 | 12/2015 | Oksengendler et al. |
| 2015/0362132 | A1 | 12/2015 | Mccane et al. |
| 2016/0153641 | A1 | 6/2016 | Fang et al. |
| 2019/0041009 | A1 | 2/2019 | May |
| 2019/0072261 | A1 | 3/2019 | Gorman et al. |
| 2019/0086060 | A1 | 3/2019 | Gorman et al. |
| 2020/0275540 | A1 | 8/2020 | O'Kell et al. |

OTHER PUBLICATIONS

ILP Low Profile Webinar Slides, "Low Profile Channel LED Fixture or Retrofit" (ILP Retrofit Webinar Slides).

ILP Retrofit Video Transcript (ILP Transcript).

IPR Case No. IPR2022-00534 ('628 IPR).

IPR Case No. IPR2022-00569 (1)41 Petition).

Judgement Final Written Decision Determining All Challenged Claims Unpatentable, Denying Patent Owner's Motion to Amend and Denying Patent Owner's Motion to Exclude, entered Sep. 15, 2023 re: *Walmart Inc. and Current Lighting Solutions, LLC*, vs. *Power Concepts, LLC*; United States Patent and Trademark Office, Patent Trial and Appeal Board—IPR2022-00569/U.S. Pat. No. 10,429,041 B2.

Judgement Final Written Decision Final Written Decision Determining All Challenged Claims Unpatentable, Denying Patent Owner's Motion to Amend, Denying Patent Owner's Motion to Exclude, entered Sep. 15, 2023 re: *Walmart Inc. and Current Lighting Solutions, LLC*, vs. *Power Concepts, LLC*; United States Patent and Trademark Office, Patent Trial and Appeal Board—IPR2022-00534/ U.S. Pat. No. 10,837,628 B2.

LEDs Magazine, Kevin Dowling Leaves Philips Color Kinetics https://www.ledsmagazine.com/manufacturing-services-testing/substrates-wafers/article/16700097/kevin-dowling- leaves-philips-color-kinetics.

Seoul Semiconductor Product Data Sheet for Mid-Power LED— 5630 Series, STW8Q14D (Nov. 16, 2022).

Lamptech website—"Effect of Ambient Temperature", available at http://www.lamptech.co.uk/Documents/FL%20Temperature.htm (2011) (last accessed Feb. 14, 2023).

Architectural Resources Publication 074—https://www.lrc.rpi.edu/resources/publications/lpbh/ 074Architectural.pdf.

Stouch Lighting—Lighting Comparison, LED vs Fluorescent and CFL—https://www.stouchlighting.com/blog/fluorescent-vs-led-vs-cfl#:~:text=CRI%20for%20LED%20is%20highly,improvement%20when%20compared%20to%20LED.

K. Fotios & M. Kent—Measuring Discomfort from Glare: Recommendations for Good Practice—https://www.energy.gov/eere/ssl/articles/measuring- discomfort-glare-recommendations-good-practice#:~:text=Glare%20is%20defined%20by%20the,contrasts%E2%80%9D%20%5BCIE %202019a%5D.

Lumileds Technical Datasheet DS25, Power Light Source—Luxeon Emitter (2005).

U.S. Department of Energy, Multi-Year Program Plan FY'07-FY'12, Solid-State Lighting Research and Development, issued Mar. 2006.

Underwriters Laboratories Inc. Standard for Safety, UL 8750: Light Emitting Diode (LED) Equipment for Use in Lighting (Nov. 18, 2009).

Sylvania Product Catalog for Product No. 21781, available at http://ecom.mysylvania.com/sylvaniab2c/catalog/updateltems.do (last accessed Jun. 17, 2008).

U.S. Department of Energy, Multi-Year Program Plan FY'09-FY'14, Solid-State Lighting Research and Development, issued Mar. 2008.

IES Illuminating Engineering Society, IES LM079-08, Approved Method: Electrical and Photometric Measurements of Solid-State Lighting Products (2008).

The Subcommittee on Solid State Lighting of the IES Testing Procedures Committee, IES TM-21-11—Projecting Long Term Lumen Maintenance of LED Light Sources (2011).

(56) References Cited

OTHER PUBLICATIONS

U.S. Department of Energy CALiPER Benchmark Report, Performance of T12 and T8 Fluorescent Lamps and Troffers and LED Linear Replacement Lamps (Jan. 2009).
Specifications for Nichia Chip Type White LED, Model: NSCW100.
Dyble et al., "Impact of Dimming White LEDs: Chromaticity Shifts Due to Different Dimming Methods", 5941 Fifth International Conference on Solid State Lighting, Proceedings of SPIE 291 (2005).
Simons, "Simplified Formula for Estimating Natural Convection Heat Transfer Coefficient on a Flat Plate" (2021), available at https://www.electronics-cooling.com/2001/08/simplified-formula-for- estimating-natural-convection-heat-transfer-coefficient-on-a-flat-plate (last accessed Feb. 17, 2023).
"Optoelectronics Applications Manual", S. Gage et al., (eds.), p. 2.11-2.13, 9.10-9.12 (1977).
"Lighting Handbook, Reference Application", 8th ed., M.S. Rea (ed.), pp. 184-186, 356-357 (1993).
Underwriters Laboratories Inc. "Standards for Safety No. UL1598—Luminaires", 3rd ed., pp. 38, 138 (Sep. 17, 2008).
Nakamura, "Present Performance of InGaN Based Blue/Green/Yellow LEDs", 3002 SPIE 26 (1997).
U.S. Department of Energy, Energy Efficiency & Renewable Energy Solid-State Lighting R&D Plan (Jun. 2016).
Curran, "New Rules for Lighting SSL-101", Design Lights Consortium Stakeholder Meeting dated Oct. 28, 2012.
DesignLights™ Consortium, "New Specifications Webinar" dated Sep. 12, 2012.
Philips Product Data for T8 Standard—F32T8/TL741 Alto dated Aug. 4, 2012.
TCP, Inc. F32T8/830 Lamp Specifications (2013).
GE Lighting Ultra Energy Saving F32T8 High Lumen (2013).
Illuminating Engineering Society, IES LM-79-08 "Approved Method: Electronical and Photometric Measurement of Solid-State Lighting Products" (2008).
Narendran et al., "Life of LED-Based White Light Sources", 1(1) IEEE/OSA Journal of Display Technology 167-171 (2005).
Luxeon™ 1-Watt Star Technical Data for DS23 (2002).
Illuminating Engineering Society, ANSI/IES LM-80-20 "Approved Method: Measuring Luminous Flux and Color Maintenance of LED Packages, Arrays, and Modules" (2020).
Illuminating Engineering Society, ANSI/IES LM-85-20 Approved Method: "Optical and Electrical Measurements of LED Packages and Arrays" (2020).
Hansen et al., "LED Luminaire Reliability: Impact of Color Shift", Next Generation Lighting Industry Alliance LED Systems Reliability Consortium (Apr. 2017).
U.S. Department of Energy, Energy Efficiency & Renewable Energy CALiPER Report 20.5: "Chromaticity Shift Modes of LES PAR38 Lamps Operated in Steady-State Conditions" (Feb. 2016).
Tuttle et al., "Understand the True Cost of LED Choices in SSL Systems" (Magazine) dated Feb. 13, 2014, available at https://www.ledsmagazine.com/leds-ssl-design/packaged-leds/article/16695263/understand-the-true-cost-of-led-choices-in-ssl- systems-magazine (last accessed Jan. 20, 2023).

U.S. Department of Energy, Energy Efficiency & Renewable Energy Gateway Demonstration—Color Maintenance of LEDs in Laboratory and Field Applications (Sep. 2013).
Bretschneider, "Predicting Chromaticity Shift in LEDs and SSL Products" dated Nov. 27, 2018.
Illuminating Engineering Society, ANSI/IES TM-35-19 Technical Memorandum: "Projecting Long-Term Chromaticity Coordinate Shift of LED Packages, Arranges, and Modules" (2019).
IAEI Magazine, Modifications Affect UL Listing, available at https://iaeimagazine.org/2001/2001november/modifications-affect-ul-listing/, last visited on Jan. 23, 2023.
Energy Star® Program Requirements for Integral LED Lamps Partner Commitments and Energy Star® Program Requirements for Integral LED Lamps Energy Star Eligibility Criteria dated Dec. 3, 2009.
Energy Star® Program Requirements for Lamps (Light Bulbs), Partner Commitments, Version 2.1, effective Oct. 1, 2017.
Northeast Energy Efficiency Partnerships, Inc. Commercial Lighting Remodeling Initiative dated Jul. 30, 1997.
Saskatchewan Energy Management Task Forces, Technology Information Sheet for Fluorescent Lamp Ballasts, available at https://www.emtfsask.ca/tech_info_sheets.html (last accessed Feb. 17, 2023).
DesignLights Consortium Product Qualification Criteria, Technical Requirements Table 1, v.1.6, dated Jul. 22, 2011.
Leotek Lite-On Group, "Beyond BUG Ratings: Considerations of Evaluating Glare" (2019).
Bergh et al., "The Promise and Challenge of Solid-State Lighting", 54 Physics Today 42 (2001).
Leviton Manufacturing Co., Inc. Linear Fluorescent Lampholders for Today's Energy-Efficient Lighting Fixtures (2006).
MatWeb Material Property Data for Aluminum 6063-O, available at https://www.matweb.com/search/DataSheet.aspx?MatGUID=bcd1abbd8d6d47b1b9896af80a3759c6&ckck=1 dated Jan. 16, 2000 (last accessed on Feb. 16, 2023).
Howstuffworks website—How to Install a Fluorescent Light, available at https://home.howstuffworks.com/home-improvement/repair/how-to-install-a-fluorescent-lamp.htm (last accessed Feb. 19, 2023).
Lighting Research Center, "Lighting Patterns for Homes" (2015).
Israel, "Tools of the Trade: Cove Lighting", available at https://www.ies.org/lda-magazine/lda-hot-topics/tools-of-the-trade-cove-lighting (last accessed Feb. 17, 2023).
Howard Lighting Products Specification Sheet for F54T5/841/HO dated Sep. 5, 2013.
"What is LM-80? A Guide to LM-80 Standard" https://www.nvcuk.com/technical-support/view/what-is-lm-80-a-guide-to-lm-80-standard-17.
Architect Magazine—Technology Products "Establishing LED Test Data Protocols" https://www.architectmagazine.com/tech nology/products/establishing-led-test-data-protocols_o?o=1.
U.S. Dept of Energy—"Understanding LM-79 Reports" https://betterbuildingssolutioncenter.energy.gov/sites/default/files/attachments/und erstanding_lm79_reports.pdf.
LEDs Magazine, "Philips to Acquire Color Kinetics in $791 Million Deal"—https://www.ledsmagazine.com/manufacturing-services-testing/substrates-wafers/article/16700301/philips-to-acquire-color-kinetics-in-791-million-deal.

* cited by examiner

CEILING LIGHT LED RETROFIT KIT

CROSS REFERENCE TO RELATED APPLICATIONS

This application is a continuation of, and claims the benefit of priority to, U.S. application Ser. No. 18/130,531, filed on Apr. 4, 2023, now issued as U.S. Pat. No. 11,953,183, which is a continuation of, and claims the benefit of priority to, U.S. application Ser. No. 17/023,506, filed Sep. 17, 2020, now issued as U.S. Pat. No. 11,649,952, which is a continuation of, and claims the benefit of priority to, U.S. application Ser. No. 16/546,729, filed Aug. 21, 2019, now issued as U.S. Pat. No. 10,837,628, which is a continuation of, and claims the benefit of priority to, U.S. application Ser. No. 15/441,447, filed on Feb. 24, 2017, now issued as U.S. Pat. No. 10,429,041, which claims the benefit of priority of U.S. Provisional Application Ser. No. 62/299,295, filed on Feb. 24, 2016, which is incorporated herein in its entirety.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIALS SUBMITTED ON A COMPACT DISC OR AS A TEXT FILE VIA THE OFFICE ELECTRONIC FILING SYSTEM

Not applicable.

STATEMENT REGARDING PRIOR DISCLOSURES BY THE INVENTION OR A JOINT INVENTOR

Not applicable.

BACKGROUND OF THE INVENTION

Field of the Invention

The present invention is directed toward a ceiling light LED retrofit kit; more specifically, a kit for installation of light emitting diode lighting mounted upon a previously-installed fluorescent lighting fixture.

Description of the Related Art

Fluorescent lighting is commonly used in commercial building and office interiors. A typical fluorescent lighting fixture includes a base that is mounted to a ceiling within a building. Carried upon the base is a first electrical receptacle and a second electrical receptacle, with a fluorescent light tube extending between and energized by the two electrical receptacles. A ballast for controlling the electrical power to the fluorescent light tube is connected to the first and second electrical receptacles.

From an aesthetic standpoint, such fluorescent lighting often exposes bare fluorescent light tubes to occupants of the building. From an energy standpoint, fluorescent lighting does not most efficiently convert electrical energy into illumination.

Recent interest has arisen toward converting existing previously-installed fluorescent lighting to lighting provided by light emitting diodes ("LED"). LED lighting is more energy efficient than fluorescent lighting. It has been found that conversion from a fluorescent lighting fixture to an LED lighting fixture will provide a return on investment, in reduced energy consumption, sufficient to justify over time the costs of converting from fluorescent lighting to LED lighting.

Unfortunately, the previously-known methods and devices for converting from fluorescent lighting to LED lighting are not optimized. Various of the previously-known such devices require removal, in whole or in part, of the existing fluorescent lighting fixture. More specifically, the previously-known methods of such conversion require removal of at least the base, the electrical receptacles, and the ballast of the fluorescent lighting fixture, or some combination of such components, before an LED lighting system may be installed in its place. Furthermore, the previously-known methods of such conversion also require intensive use of skilled electricians to wire each of the new LED lighting devices, which increases the costs of such conversions.

In view of the foregoing, it would be desirable to have a ceiling light LED retrofit kit optimized to reduce installation time, to reduce the need for services from a skilled electrician, and to leave in place as much of the previously-installed fluorescent lighting apparatus as possible thereby saving labor, reducing waste, and improving return on investment.

BRIEF SUMMARY OF THE INVENTION

The following simplified summary of the invention provides a basic understanding of some aspects of the invention. This summary is not an extensive overview of the invention. Its purpose is to present concepts of the invention in a simplified form as a prelude to the more detailed description that is subsequently presented.

A simplified, optimized ceiling light retrofit kit is provided.

In accordance with some aspects of some embodiments of the present invention, the ceiling light LED retrofit kit includes a combination for illuminating the interior of a building. The combination comprises first a fixture attached to a building ceiling, and adapted for use of linear fluorescent light tubes. The fixture includes a base, a first electrical receptacle, and a second electrical receptacle, the first and second electrical receptacles configured for receipt of a fluorescent light tube disposed between them. The base includes a first longitudinal side and an opposite second longitudinal side.

The combination further includes a retrofit kit, the retrofit kit including a light panel, a first profile, and a second profile. The light panel includes a first side facing the fixture and an opposite second side. The light panel, the first profile, and the second profile may extend longitudinally from proximate the first electrical receptacle to proximate the second electrical receptacle, and be parallel one-to-another.

The retrofit kit also includes at least one light emitting diode, the at least one light emitting diode residing on the second side of the light panel.

The first profile extends from the light panel to the first longitudinal side of the base and is engaged therewith. The second profile extends from the light profile to the second longitudinal side of the base, and is engaged therewith.

The first profile, the second profile, light panel, and base define therebetween a raceway.

Wiring, in electrical communication with the light emitting diode, resides within the raceway.

The foregoing description sets forth broadly certain features of the present invention, so that the detailed description herein below may be better understood, and so that the present contributions to the art from this invention may be better appreciated. Additional features of the invention will be described herein below.

BRIEF DESCRIPTION OF THE SEVERAL VIEWS OF THE DRAWINGS

The aspects described above, as well as other apparent aspects, advantages, and objectives of the present invention are apparent from the detailed description below, in combination with the drawings, in which.

DETAILED DESCRIPTION OF REPRESENTATIVE EMBODIMENTS

Figure 1:
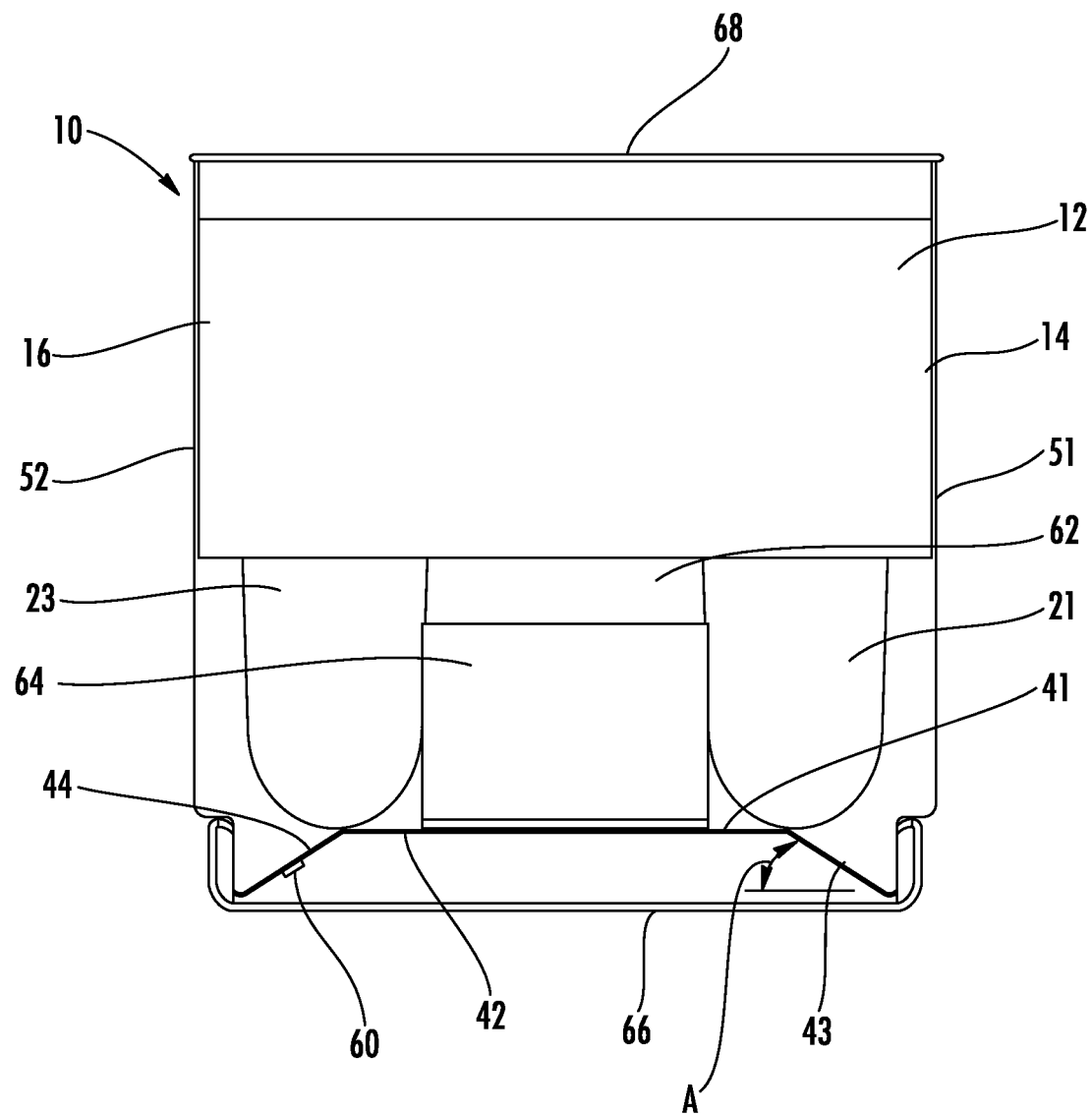
FIG. 1 is an end elevation view of an embodiment of a ceiling light LED retrofit kit in accordance with the present invention.

Reference will now be made in detail to the presently preferred embodiments of the invention, one or more examples of which are illustrated in the drawings. Each example is provided by way of explanation of the invention, and not by way of limitation of the invention. For example, features illustrated or described as part of one embodiment may be used on another embodiment to yield a still further embodiment. It is intended that the present application include such modifications and variations as come within the scope and spirit of the invention.

A ceiling light LED retrofit kit 30 is disclosed.

Retrofit kit 30 may be understood in certain embodiments to be included in a combination with a fixture 10.

Fixture 10 may include a pre-installed base 12 attached to the interior ceiling 68 of a building. Base 12 may be understood to define a first longitudinal side 14 and an opposed second longitudinal side 16. Base 12 may also include a first electrical receptacle 21, a second electrical receptacle 22, a third electrical receptacle 23, and so forth.

First electrical receptacle 21 and second electrical receptacle 22 may be configured and positioned for receipt of a linear fluorescent light tube disposed between them and energized by them.

Generally, retrofit kit 30 is adapted to conceal or obscure the pre-installed base 12 so as to provide the appearance that the fixture 10 is new or completely replaced. Retrofit kit 30 may include a light panel 40. Light panel 40 may define a first side 41 that faces fixture 10 and an opposed second side 42. In some embodiments, the light panel 40 may include a first angled wing 43 and a second angled wing 44. One or more light emitting diode 60 may be disposed on second side 42 of light panel 40. In certain embodiments, it may be found that disposing a light emitting diode 60 on first angled wing 43 or second wing 44 provides a more desirable path of illumination from light emitting diode 60. Retrofit kit 30 may also include a power supply 64, to energize the LED 60.

Retrofit kit 30 may also include a first profile 51 and second profile 52. The first profile 51 and/or second profile 52 may be integral with light panel 40, which may be disposed between the first profile 51 and the second profile 52. In other embodiments, first profile 51 and/or second profile 52 may be separate members that are attached to light panel 40, for example, at opposing, longitudinal edges of light panel 40.

Light panel 40, first profile 51, and second profile 52 may extend longitudinally from proximate the first electrical receptacle 21 to proximate the second electrical receptacle 22.

First profile 51 may extend from light panel 40 to first longitudinal side 14 of base 12 of fixture 10. Second profile 52 may extend from light panel 40 to the second longitudinal 16 of base 12 of fixture 10.

First profile 51 and second profile 52 may each be flat or may instead include a rib 59 that extends longitudinally from one end of the profile to the opposing end, respectively. Rib 59 may be optionally included to provide enhanced stiffness to first profile 51 and/or second profile 52

First profile 51 and second profile 52 may be attached to first longitudinal side 14 and second longitudinal side 16, respectively. With first profile 51 attached to first longitudinal side 14 and second profile 52 attached to second longitudinal side 16, first profile 51, second profile 52, light panel 40, and base 12 may define between them a raceway 62. Upon final assembly, electrical wiring in electrical communication with light emitting diode 60 may reside within raceway 62. Furthermore, power supply 64 for the LED 60 may be stored in raceway 62.

When attached to pre-installed base, the present ceiling light LED retrofit kit is adapted to conceal the prior components and to provide the appearance of a new or replaced light fixture.

FIG. 1 illustrates an embodiment of the present ceiling light LED retrofit kit. Base 12 of fixture 10 is attached to ceiling 68. Base 12 includes first longitudinal side 14 and second longitudinal side 16. As illustrated in FIG. 1, first electrical receptacle 21 and third electrical receptacle 23, which had previously been used in base 12 to hold and power a longitudinal fluorescent light tube, may be left within the ceiling light LED retrofit kit. As also illustrated, power supply 64, used to energize the LED, may be simply located within raceway 62.

In the embodiment illustrated in FIG. 1, light panel 40, first profile 51, and second profile 52 are integral. In other embodiments, first profile 51 and second profile 52 may be separate elements that have been attached to light panel 40.

First profile 51 is attached to first longitudinal side 14 of base 12 of fixture 10. Second profile 52 is attached to second longitudinal side 16 of base 12 of fixture 10.

A light emitting diode 60 may be disposed on second angled wing 44 of light panel 40. Light emitting diode 60 is in electrical communication with an electrical power source (not shown).

A lens 66 may be attached to light panel 40, as illustrated in FIG. 1. Lens 66 may be configured to provide a pleasing and esthetically attractive dispersion of light emitted from light emitting diode 60. FIG. 1 illustrates an angle A formed between the surface of first angled wing 43 and the surface of the lens 66, when attached.

Figure 2:
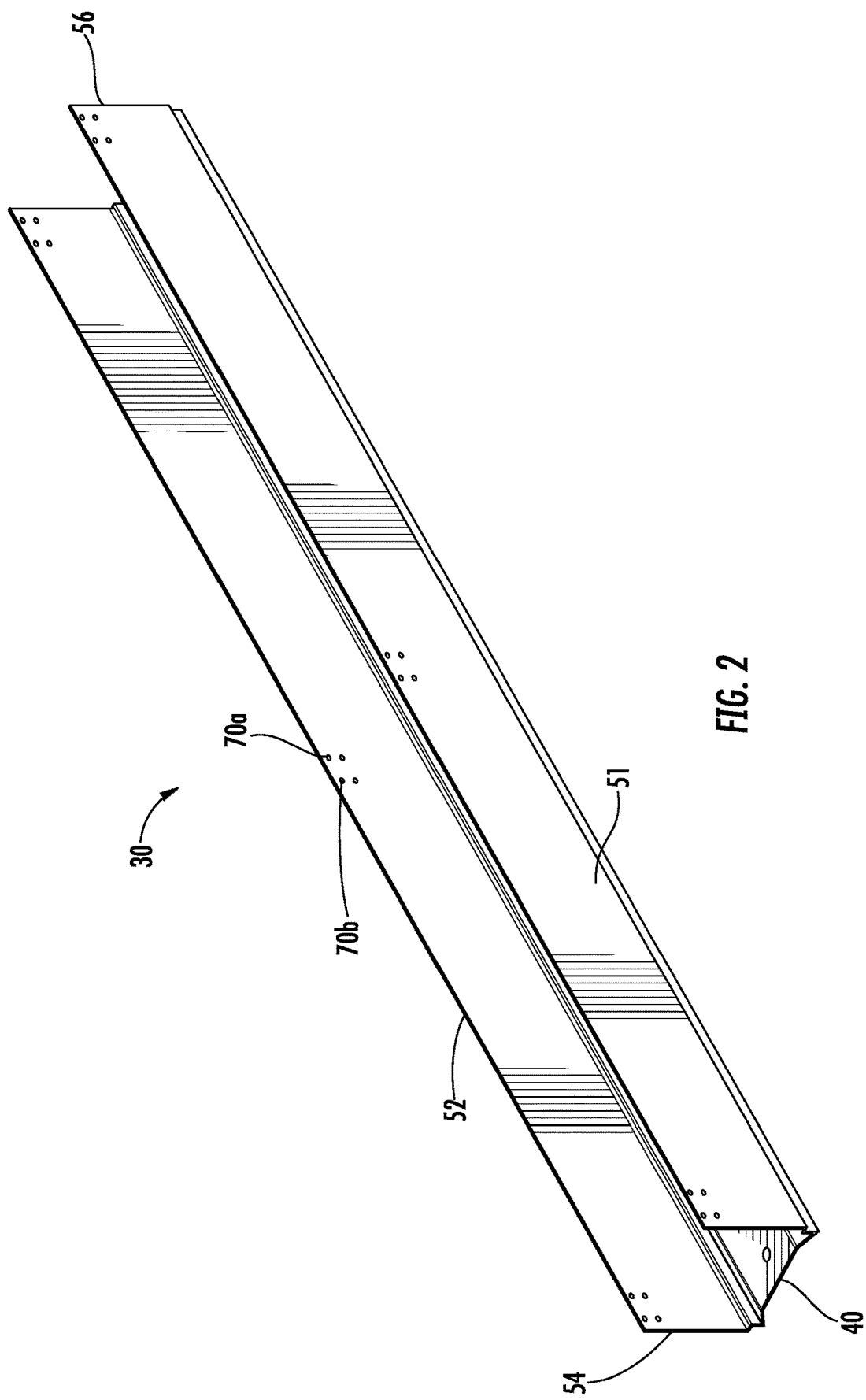
FIG. 2 is a perspective view of an embodiment of a portion of a retrofit kit in accordance with the present invention.

FIG. 2 illustrates an embodiment of a retrofit kit 30. As depicted therein, retrofit kit 30 includes a first profile 51, extending longitudinally, and a second profile 52 extending longitudinally. First profile 51 and second profile 52 may include a plurality of apertures, for example, 70a and 70b, for attachment to base 12 of fixture 10.

Figure 3:
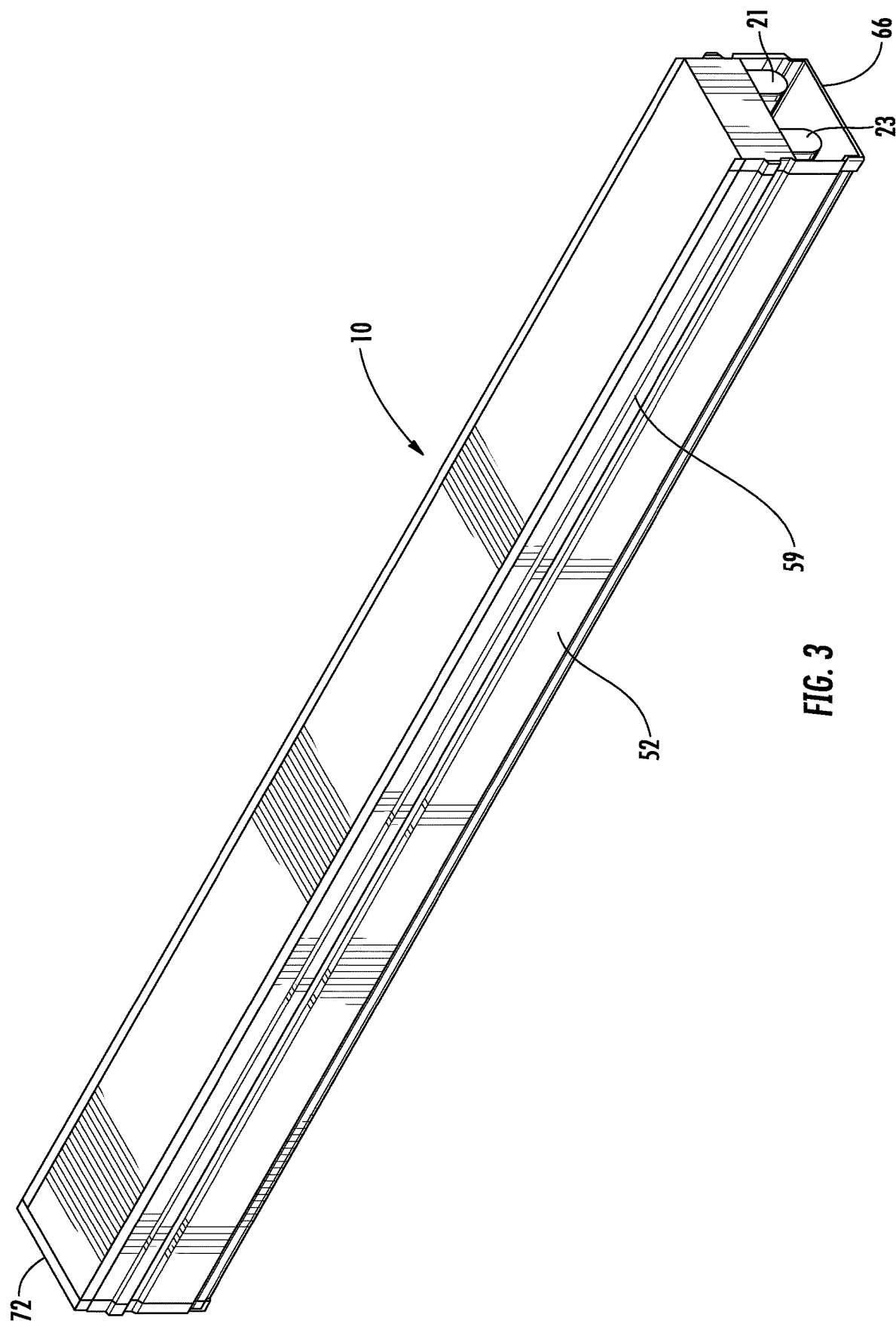
FIG. 3 is a perspective view of an embodiment of a ceiling light LED retrofit kit in accordance with the present invention.
Figure 4:
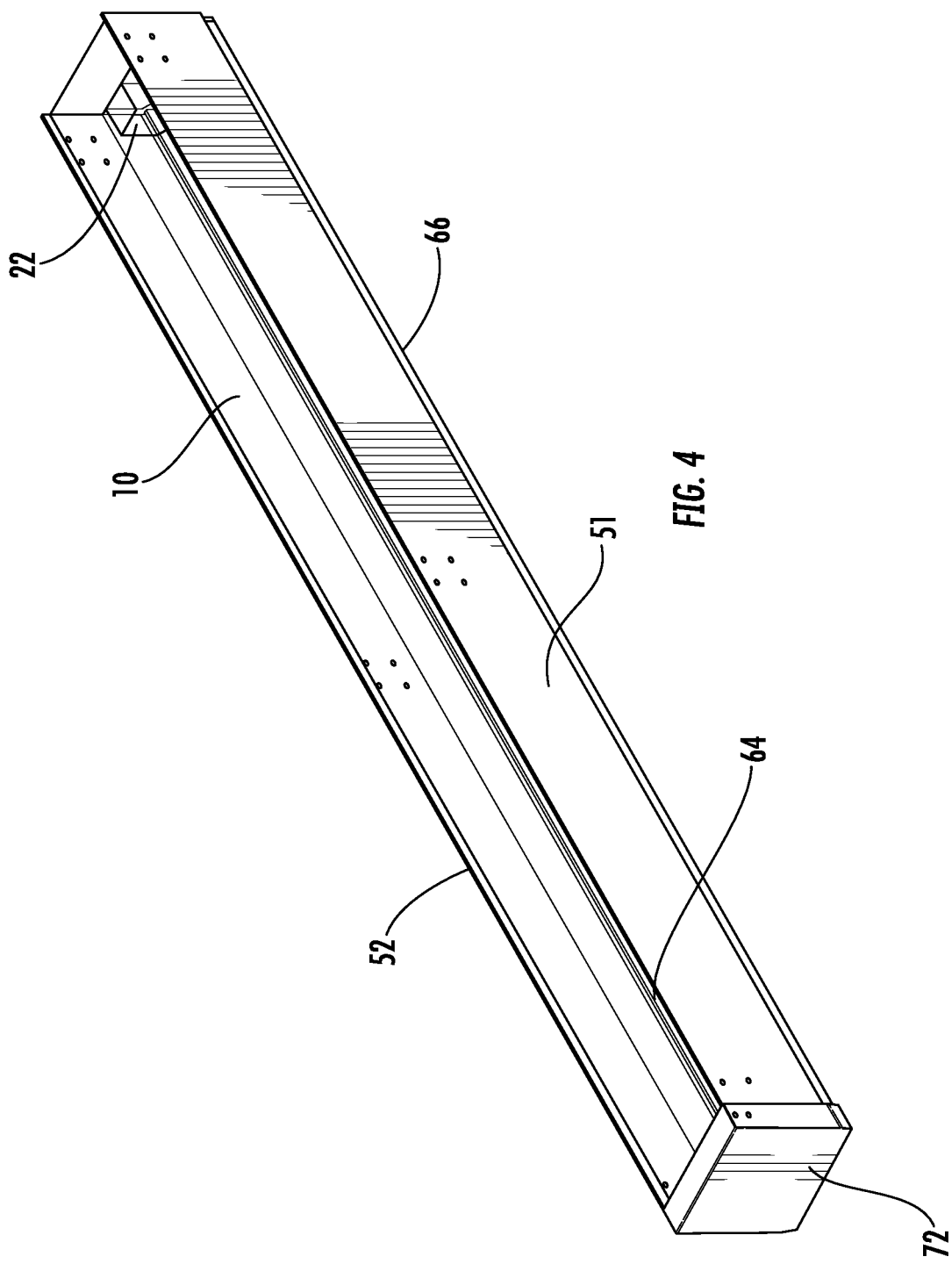
FIG. 4 is a perspective view of an embodiment of a ceiling light LED retrofit kit in accordance with the present invention.

FIGS. 3 and 4 are illustrations of an assembled LED retrofit kit. In FIG. 3, retrofit kit 30 includes a first profile 51, extending longitudinally, and a second profile 52 extending longitudinally. In this embodiment, first profile 51 and second profile 52 are separate. A lens 66 is illustrated as attached to first profile and second profile, such as by an endcap or clip, for example, 72 (shown in FIG. 7). As illustrated, first profile 51 and second profile 52 may include one or more longitudinal ribs, for example, 59, complimenting and corresponding to one or more endcap ribs. Second profile 52 is illustrated as attached to first longitudinal side 14 of base 12 of fixture 10.

FIG. 4 is an illustration of an assembled LED retrofit kit. Fixture 10, which includes second electrical receptacle 22, is illustrated in phantom. First profile 51 is illustrated as attached to first longitudinal side 14 of base 12 of fixture 10. Power supply 64 is illustrated as residing within raceway 62 and endcap 72 is shown in place upon the assembly.

Figure 5:
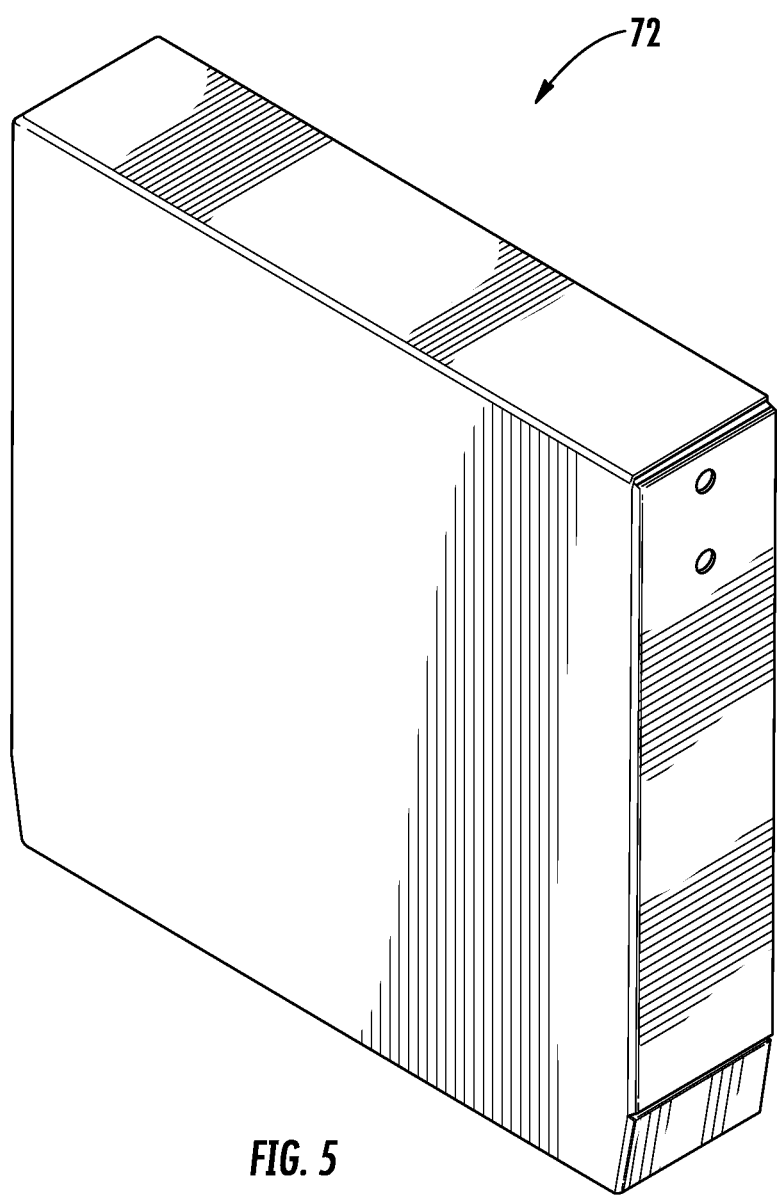
FIG. 5 is a perspective view of an embodiment of an endcap of a ceiling light LED retrofit kit in accordance with the present invention.

FIG. 5 is a perspective view of an endcap 72, for use with one embodiment of the present ceiling light LED retrofit kit.

Figure 6:
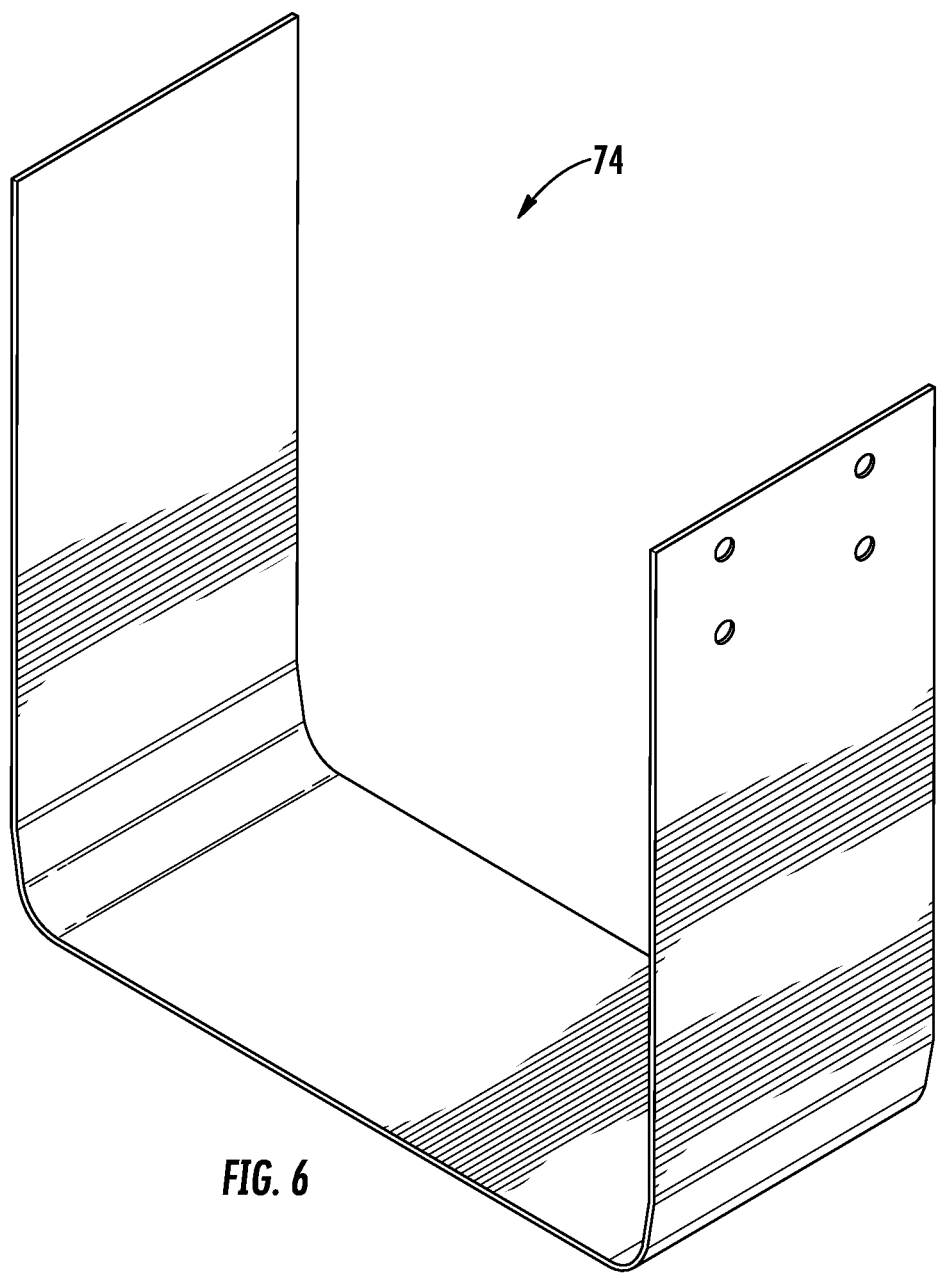
FIG. 6 is a perspective view of an embodiment of a splice of a ceiling light LED retrofit kit in accordance with the present invention

In particular applications, a plurality of light panels 40 may be disposed end to end in electrical series, for particular advantages. In such configurations, a splice 74 may be used at the juncture of any two abutting light panels 40. An embodiment of a splice 74 is depicted in FIG. 6.

Figure 7:
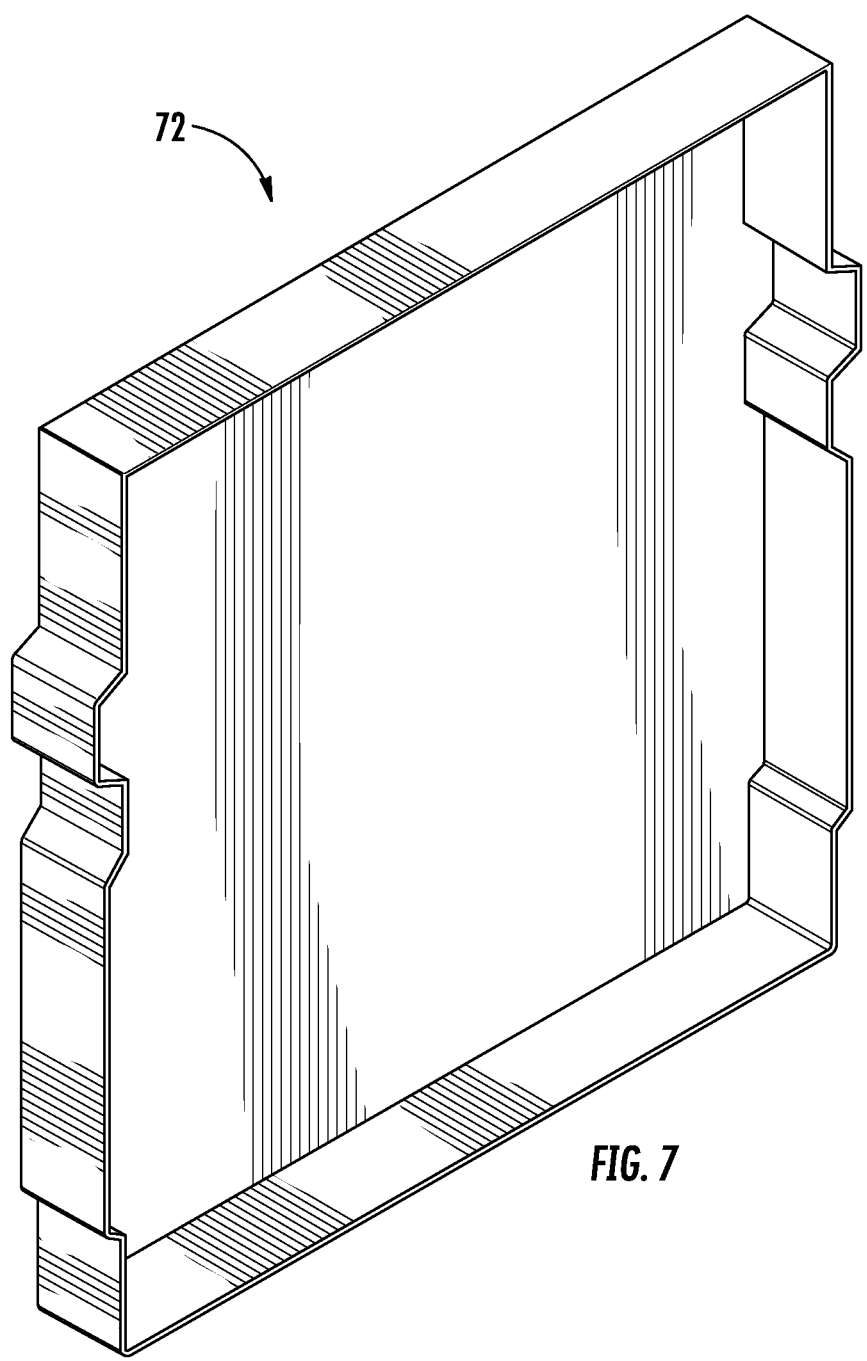
FIG. 7 is a perspective view of an embodiment of an endcap of a ceiling light LED retrofit kit in accordance with the present invention.

FIG. 7 is a perspective view of an endcap 72, for use with one embodiment the present ceiling light LED retrofit kit. In this embodiment, endcap 72 includes one or more ribs that correspond the one or more longitudinal ribs, for example, 59, along the first profile 51 and the second profile 52, respectively.

Figure 8:
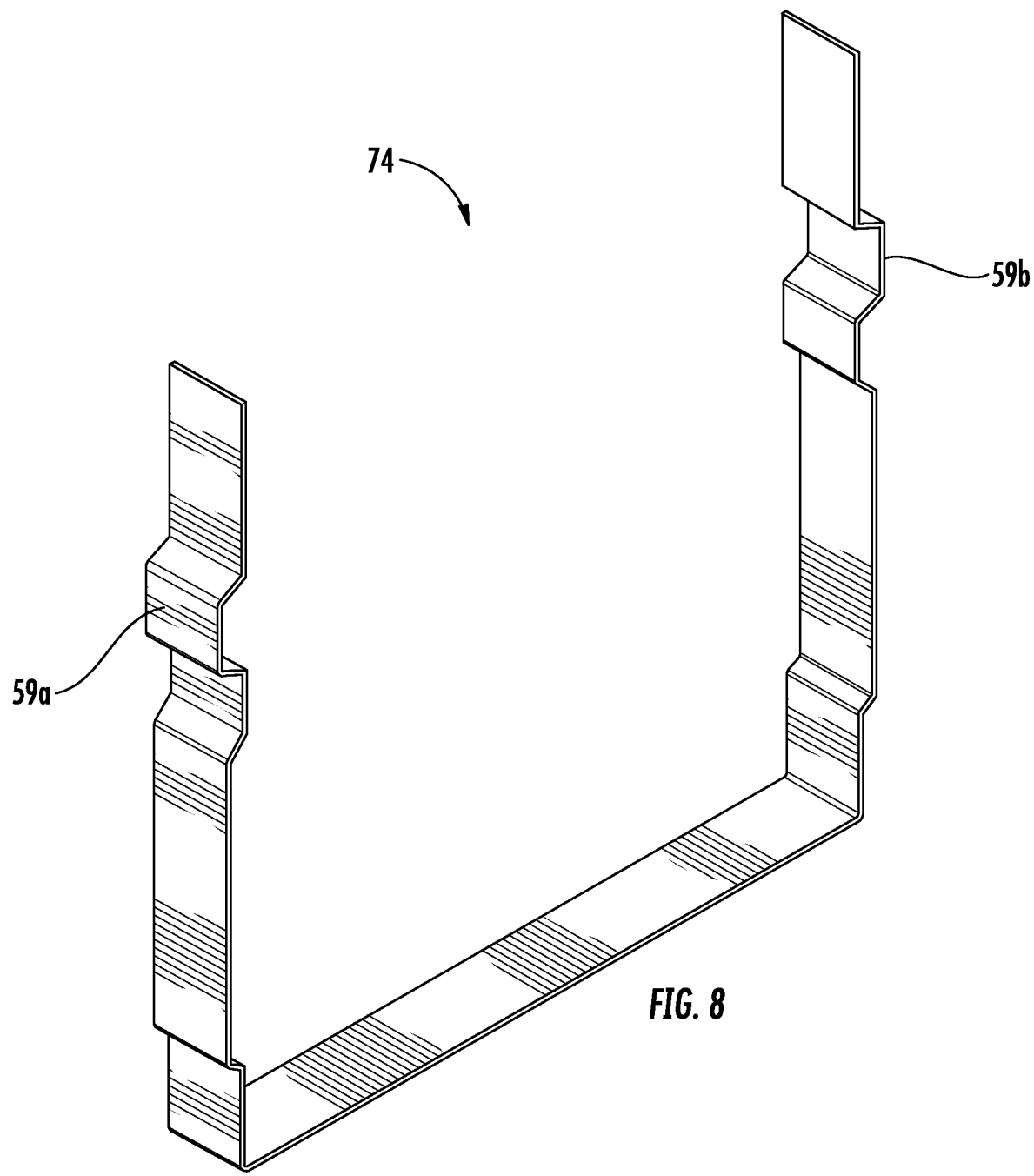
FIG. 8 is a perspective view of an embodiment of a splice of a ceiling light LED retrofit kit in accordance with the present invention.

In some applications, a plurality of light panels 40 may be disposed end to end in electrical series, for particular advantages. In such configurations, a splice 74 may be used at the juncture of any two abutting light panels 40. An embodiment of a splice 74 is depicted in FIG. 8. In this embodiment, the splice may include one or more corresponding ribs, for example, 59a and 59b, that correspond to the one or more longitudinal ribs, for example, 59, along the first profile 51 and the second profile 52, respectively.

The present invention further contemplates a method for retrofitting pre-installed fixtures or bases using the kit described herein. In one embodiment, the method may include the steps of: 1) identifying a fixture having a pre-installed base having a first longitudinal side and a second longitudinal side; 2) providing a ceiling light LED retrofit kit comprising: a first profile, an opposing second profile, and a light panel, the light panel being disposed between the first profile and the opposing second profile; 3) connecting the first profile to the first longitudinal side, and the second profile to the second longitudinal side of the pre-installed base; 4) providing a light emitting diode and electrically connecting it to the light panel; and 5) covering the light panel with a lens.

So configured, the ceiling light LED retrofit kit of the present invention offers several advantages, efficiencies, and optimizations. Because it is attached to an old fluorescent light fixture, added rigidity and strength is accomplished. For that reason, for example, thinner material may be used with first profile 51 and/or second profile 52, achieving material costs savings, yet providing sufficient structural strength. Similarly, because the present ceiling light retrofit kit does not require disassembly of the first, second, and so forth electrical receptacles 21, 22 of the earlier fixture 10, labor and disposal costs are avoided. (Such electrical receptacles are sometimes referred to as "tombstones" by those with skill in this technology). Furthermore, because the previously-used, now de-energized ballast for the fluorescent light tubes can be left within the base 12, additional labor and disposal time and cost savings are achieved. As yet still a further example, the finished assembly of the within ceiling light LED retrofit kit includes a lens, rather than a previously-exposed linear fluorescent light tubes, providing a more attractive appearance and also enabling the user to provide custom refraction from the light illuminating from light emitting diode 60, as may be desired in particular applications.

While the particular ceiling light LED retrofit kit as herein shown and described is fully capable of achieving the objects of the invention, it is to be understood that it is the presently preferred embodiment of the present invention and is thus representative of the subject matter that's broadly contemplated by the present invention. It is to be further understood that the scope of the present invention fully encompasses other embodiments that may become obvious to those skilled in the art. It is intended that the present invention includes such modifications and variations as come within the scope of the appended claim and their equivalents.

The invention claimed is:

1. A retrofit kit for mounting with a previously-installed interior ceiling light fixture having a pre-installed base and first and second electrical receptacles configured to receive therebetween a fluorescent light tube, wherein the fluorescent light tube is absent and wherein the previously-installed ceiling light fixture is electrically separated from the retrofit kit, the retrofit kit comprising:
 a longitudinal body comprising:
  a first end and an opposite second end; and
  a first side configured for attachment to the pre-installed base of the previously-installed interior ceiling light fixture and a second side opposite the first side and configured to conceal the previously-installed interior ceiling light fixture, including the first and second electrical receptacles, when the retrofit kit is mounted to the previously-installed interior ceiling light fixture;
 a light panel, the light panel extending along the longitudinal body;
  the light panel having a first end for being disposed proximate the first electrical receptacle and a second end for being disposed proximate the second electrical receptacle;
  the light panel having a first side for facing the previously-installed interior ceiling light fixture and a second opposite side for facing away from the previously-installed interior ceiling light fixture; and the light panel having a light emitting diode on its second side;

electrical wiring to connect the light emitting diode to a power supply for illuminating the area beneath the light panel second side;

at least one end of the longitudinal body being configured for attachment to a longitudinal body of a second retrofit kit; and the electrical wiring of the retrofit kit being adapted to connect serially to wiring of the second retrofit kit.

2. The retrofit kit of claim 1, wherein the longitudinal body of the retrofit kit defines a raceway on its second side when the retrofit kit is mounted to a previously-installed interior ceiling light fixture.

3. The retrofit kit of claim 2, wherein the electrical wiring of the retrofit kit is at least partially housed within the raceway.

4. The retrofit kit of claim 1, further comprising a lens attached to the second side of the longitudinal body and disposed over the second side of the light panel.

5. The retrofit kit of claim 1, wherein at least one end of the longitudinal body of the retrofit kit comprises an endcap.

6. The retrofit kit of claim 1, further comprising a lens and an endcap, and wherein the endcap extends from above the light panel to below the lens.

7. A combination, the combination comprising:
a previously-installed light fixture and a retrofit kit;
the previously-installed light fixture comprising:
   first and second electrical receptacles configured to hold a fluorescent light tube therebetween but being devoid of a fluorescent light tube; and
   a de-energized ballast;
the retrofit kit comprising:
   a light panel, the light panel having a first side facing the previously-installed light fixture and an opposite second side;
   a first light emitting diode residing on the second side of the light panel; and
   an electrical conductor electrically separated from the previously-installed light fixture, in electrical communication with the light emitting diode, and adapted for electrical communication to a second retrofit kit; and residing at least in part between the first side of the light panel and the previously-installed light fixture.

8. The combination of claim 7, wherein the light panel resides at least partially between the first and second electrical receptacles.

9. The combination of claim 7, further comprising a second retrofit kit electrically connected to the retrofit kit and wherein the two retrofit kits are electrically energized by a single power supply.

10. The combination of claim 7, wherein the retrofit kit further comprises a second light emitting diode and the first light emitting diode emits light of a first color and the second light emitting diode emits light of a second color, the first and second colors being different.

11. The combination of claim 7, further comprising a lens and an endcap, wherein the endcap is in contact with both the light panel and the lens.

12. The combination of claim 7, wherein the previously-installed interior ceiling light fixture and the retrofit kit define between them a raceway in which the electrical conductor at least partially resides.

13. The combination of claim 7, further comprising:
a first angled wing integral with the light panel, residing on a first side of the light panel, and extending along the length of the light panel and away from the previously-installed interior ceiling light fixture; and a second angled wing integral with the light panel, residing on a second side of the light panel opposite the first side, and extending along the length of the light panel and away from the previously-installed interior ceiling light fixture.

14. The lighting assembly of claim 13, in which the first and second angled wings are light-reflective downward.

15. A lighting assembly for mounting with a previously-installed interior ceiling light fixture having a pre-installed base and first and second electrical receptacles configured to receive therebetween a fluorescent light tube, the lighting assembly comprising:
a longitudinal body comprising:
   a first end and an opposite second end; and
   a first side configured for attachment to the pre-installed base of the previously-installed interior ceiling light fixture and a second side opposite the first side and configured to conceal the previously-installed interior ceiling light fixture, including the first and second electrical receptacles, when the lighting assembly is mounted to the previously-installed interior ceiling light fixture;
a light panel, the light panel extending along the longitudinal body;
   the light panel having a first end for disposing proximate the first electrical receptacle and a second end for disposing proximate the second electrical receptacle;
   the light panel having a first side for facing the previously-installed interior ceiling light fixture and a second opposite side for facing away from the previously-installed interior ceiling light fixture; and
   the light panel having a light emitting diode on its second side;
electrical wiring for disposing in the raceway and to connect the light emitting diode to a power supply for illuminating the area beneath the light panel second side;
at least one end of the longitudinal body being configured for attachment to a longitudinal body of a second retrofit kit; and
the electrical wiring of the retrofit kit being adapted to connect serially to wiring of the second retrofit kit;
   a lens attached to the second side of the longitudinal body and disposed over the second side of the light panel;
   a plurality of light emitting diodes attached to the light panel between the light panel and the lens;
   an endcap adjacent to at least one of the longitudinal body ends; and
the lighting assembly having electrical circuitry independent of the previously-installed interior ceiling light fixture, the electrical circuitry connected to the light emitting diodes and adapted for series electrical connection to a second lighting assembly.

* * * * *